United States Patent [19]

Seiberling

[11] 4,202,717
[45] May 13, 1980

[54] PRE-CURING BEAD WIRE COATING

[75] Inventor: Theophilus K. Seiberling, Akron, Ohio

[73] Assignees: Mildred Kelley Seiberling; Frances S. Voke, both of Akron, Ohio

[21] Appl. No.: 722,903

[22] Filed: Sep. 13, 1976

[51] Int. Cl.² .............................................. B29H 17/34
[52] U.S. Cl. .................................. 156/136; 152/362 R; 156/272; 156/422; 428/295
[58] Field of Search .................... 152/362 R; 156/123, 156/131, 135, 136, 422, 460, 272; 428/114, 295

[56] References Cited

U.S. PATENT DOCUMENTS

| 1,536,080 | 5/1925 | Davidson | 156/136 |
| 1,813,176 | 7/1931 | Leguillon | 156/136 |
| 1,906,402 | 2/1929 | Newton | 264/DIG. 46 |
| 2,014,359 | 9/1935 | Morrison | 152/362 R |
| 3,146,146 | 8/1964 | Anderson et al. | 428/913 |
| 3,612,139 | 10/1971 | Marzocchi | 152/362 R |
| 3,826,297 | 7/1974 | Alderfer | 152/362 R |
| 3,933,566 | 1/1976 | Seiberling | 156/123 |

*Primary Examiner*—John E. Kittle
*Attorney, Agent, or Firm*—Harold S. Meyer

[57] ABSTRACT

Strands of steel bead wire or the like are individually surrounded with rubber and the rubber is then partially cured sufficiently by irradiation so that the rubber remains moldably plastic and the final cure will completely cure the rubber. Each bead core when completed is often enclosed in fabric. The completed bead assembly is incorporated in the carcass of a tire. When the tires, including the carcass, tread, etc., are cured, the rubber in the beads is completely cured and the beads are securely bonded to the balance of the tire.

6 Claims, 7 Drawing Figures

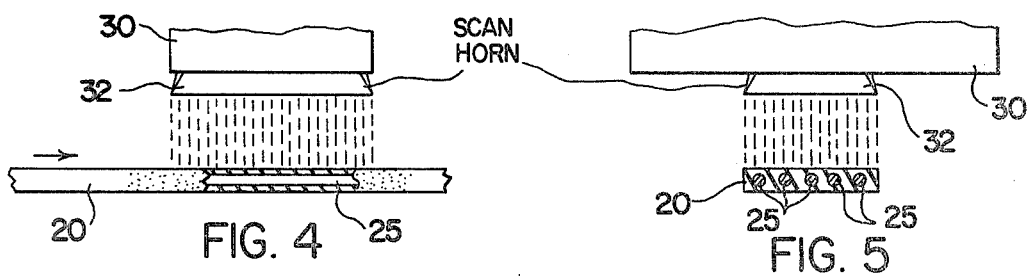
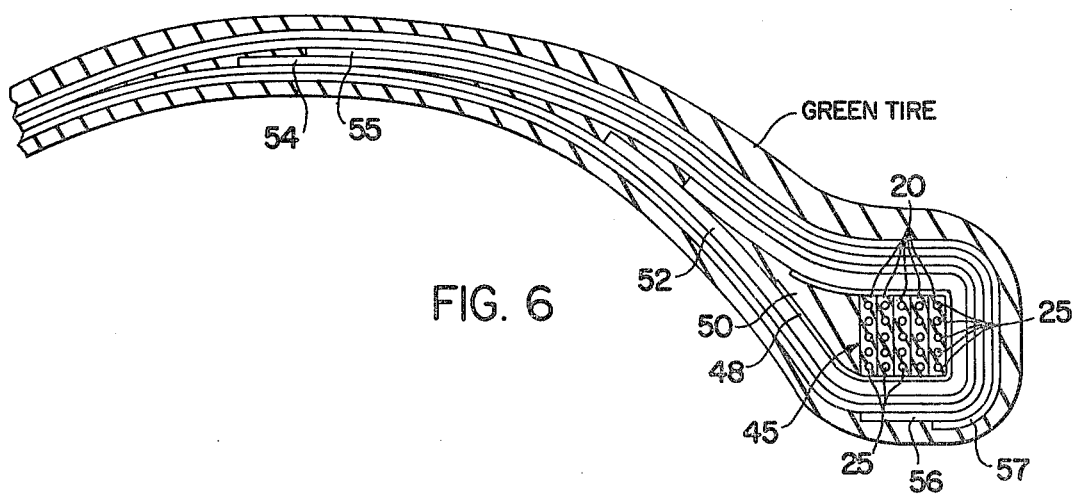
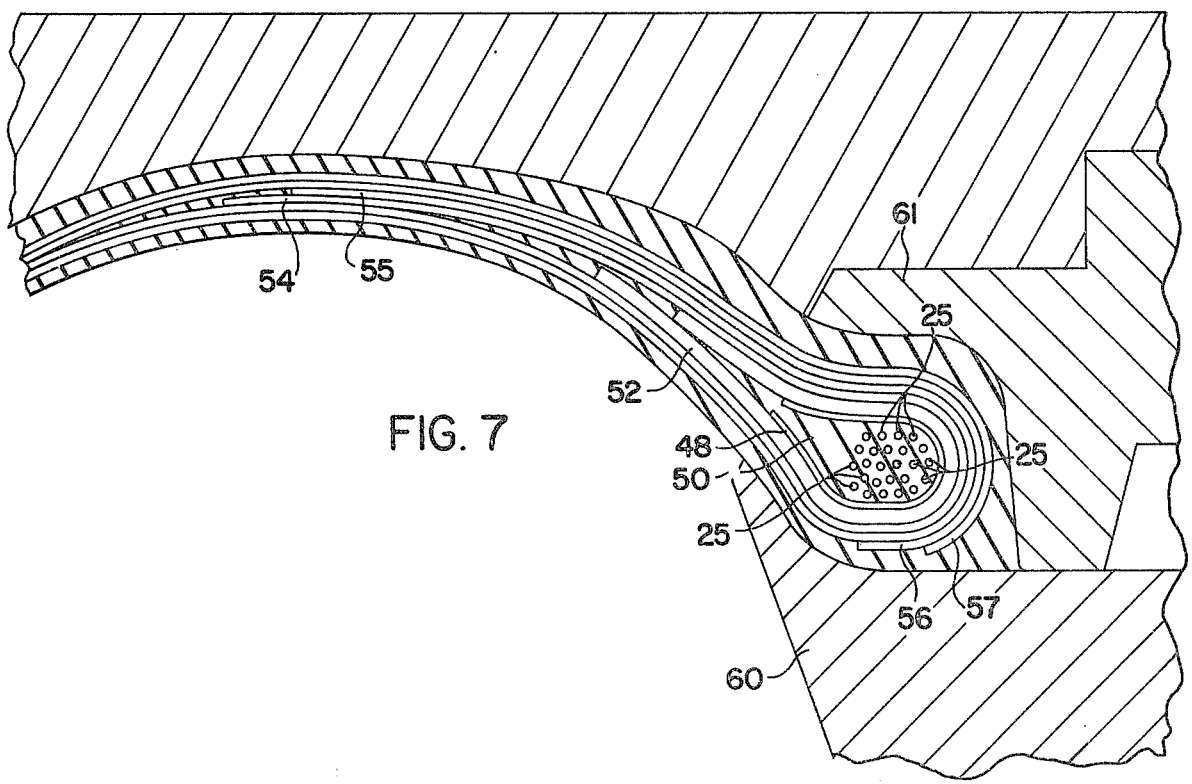

PRE-CURING BEAD WIRE COATING

PRIOR ART

Tire beads have been formed by passing a plurality of wires, arranged in a plane, through an extruder and coating them with rubber. Such rubber strips have been spirally wound to form a bead ring, and the bead ring has been wrapped in rubberized tape and has sometimes been partly or completely vulcanized before assembly with the carcass of a tire.

In the telephone industry, single wires have been coated with polyethylene and treated with irradiation which produce a rearrangement of the molecular structure. However, such assemblies are not suitable for tire construction.

The invention relates to a new method of constructing beads for a tire and a new method of constructing a tire, and relates also to the new beads, and tires with such beads.

DEFINITIONS

The irradiation to which the invention relates is preferably electron irradiation or other irradiation which has similar effects on the rubber.

The term "rubber" is used herein to refer to natural or those synthetic rubbers which are cured by irradiation. The butyl rubbers (including chlorinated butyl rubbers) are not curable by irradiation.

Steel wire such as piano wire is conventionally used as the reinforcing element with which to make the core of a bead. Other material such as fiberglass may be used. Such elements are usually coated to provide adequate bonding of rubber thereto.

The bead core is the stabilizing element in a tire which gives the tire circumferential stability and prevents the tire from coming off the rim during service. The bead core may be made of one wire or a number of wires and may be made of a wire or wires with one or more loops. Usually, each wire is completely coated with a rubber coating. A bead core may be made from a wire cable which cable is usually coated, and the bead may contain more than one cable.

GENERAL DESCRIPTION

The drawings show the production of a core from five steel wires which lie in the same plane and which are coated with rubber while passing through an extruder. The number of wires is not restrictive. It may be less than five and it may be more than five. After this strip has been fabricated, it is irradiated and cured or partially cured. The strip is then wound on a cylindrical mandrel or other means a specified number of times, which may be five, more or less, and then the ends are taped so that the strip cannot unwind.

The bead assembly is usually completed by applying a filler strip of rubber to the core, usually applied to the outer circumference of the wound core and then this bead core is often wrapped with rubberized fabric. The filler strip may be cured or partially cured before being assembled with the bead core or at any other time prior to the final cure and preferably the curing would be effected by irradiation. The bead cores are usually enclosed (or partially enclosed) by fabric which is coated by rubber or synthetic rubber, or by an other known material. The rubber on the fabric need not be cured during the initial partial cure.

Beads may contain more than one core and there may be a filler strip of rubber placed between the cores. In such cases said filler strip may be pre-cured by irradiation, then these units may be wrapped with fabric to complete the bead assembly. When this bead assembly is placed in the tire and the tire is cured, it will take less time to cure the bead assembly because the core has been previously precured, if a filler strip is used it may be pre-cured, and in cases of multiple cores, the cores have been pre-cured, and if filler strips between the cores are used these also have been pre-cured; thus the final curing time of the tire is reduced and a substantial saving has been made.

The tires of this invention are generally pneumatic. They may be belted, but need not be.

The beads of this invention are not limited to any particular bead structure or design but may be structured as desired.

The initial cure of the bead core is effected before the bead assembly is incorporated with a tire carcass. It may only partially cure the rubber in the bead core, or this rubber may be completely cured. The object is to reduce the time of the final cure of the tire. This initial cure is preferably effected by electron irradiation the molecular structure of equivalent forms of irradiation of the rubber because (a) it can be done in less time than is required for curing by sulfur and heat, and (b) rubber partially cured by such irradiation is more tacky than if partially cured by sulfur and heat and thus forms (a) a better bond of the rubber to the bead reinforcing element and (b) a better bonding together of the reinforcing strips which are usually wound to form the bead assembly. It is noted that bead-reinforcing elements, such as brass-plated steel wire or cable, undesirably shield the rubber from irradiation when used for curing a core, bead assembly or bead portion and greatly reduce penetration of irradiation into same.

Usually, the bead-reinforcing elements are arranged in a plane when passed through an extruder in which they are coated with rubber, but this is not necessary.

Alternatively, the wires or other individual reinforcing elements may be spread as filler for a sandwich between portions of rubber. One or both such portions may be cured or partially cured before the reinforcing element is incorporated in the sandwich. The reinforcing elements may be incorporated in the rubber in any desired manner and usually they are separated by rubber.

The bead core may be wrapped with fabric or the like, after the initial irradition, and this fabric may be treated with rubber which may be at least partially cured during the initial irradiation. Wrapping is not essential.

The preliminary cure or partial cure of the rubber which contacts the reinforcing element, which is usually steel wire, may be effected before being formed into the core or during the forming of the core or after the core is formed but before the core is incorporated in the carcass.

The initial cure is most efficiently carried out by curing or partially curing a small strip in which there is a single layer of reinforcing elements or curing or partially curing any other small increment of the bead core before the said reinforcing element or small increment is wound and assembled in the core.

If the initial cure or partial cure is by irradiation, a much lower voltage is required to penetrate such a thin strip or other small increment in which the reinforcing elements are embedded, than a thicker strip or portion. The rubber containing one or more reinforcing elements may be cured by irradiation from more than one side, in order to obtain the depth of cure required to partially cure the entire thickness of the rubber. Thus, the subsequent final cure may be materially shortened with substantial saving in time in manufacturing the tire and in the cost of the tire.

The rubber in which the reinforcing elements are embedded may be suitably compounded with sulfur, etc. to be cured by heat.

The irradiation which rearranges the molecular structure is preferably electron irradiation. However, X-rays and/or gamma rays may be used.

THE DRAWINGS

The drawings illustrate a preferred method of producing beads and a tire made by the preferred process. In the drawings:

FIG. 4 is a section on the line 4—4 of FIG. 2;

FIG. 5 is a section on the line 5—5 of FIG. 3;

FIG. 6 is a section through a green tire, the and

FIG. 7 is a section through a cured tire in the bead section of a tire mold.

SPECIFIC DESCRIPTION

Figure 2:
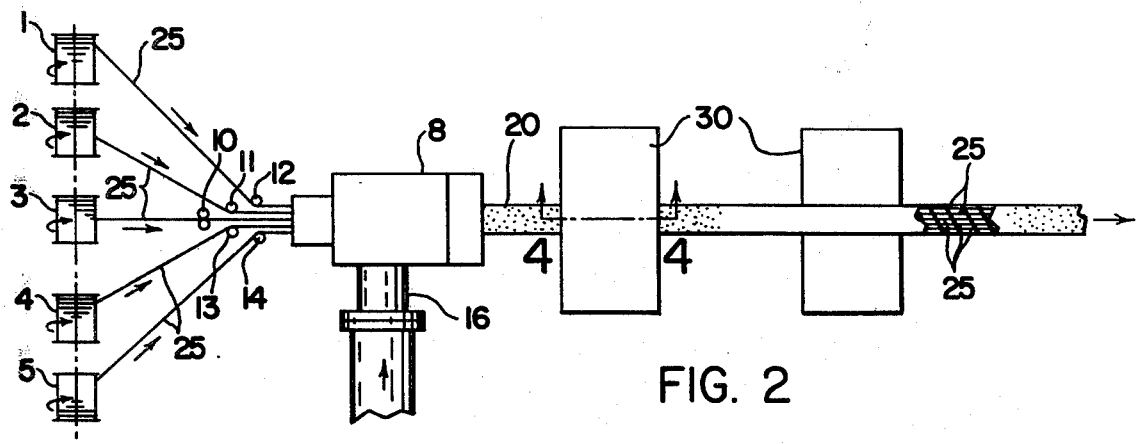
FIG. 2 is a plan view of equipment for embedding wires or the like in rubber with means for treating the same by irradiation.
Figure 3:
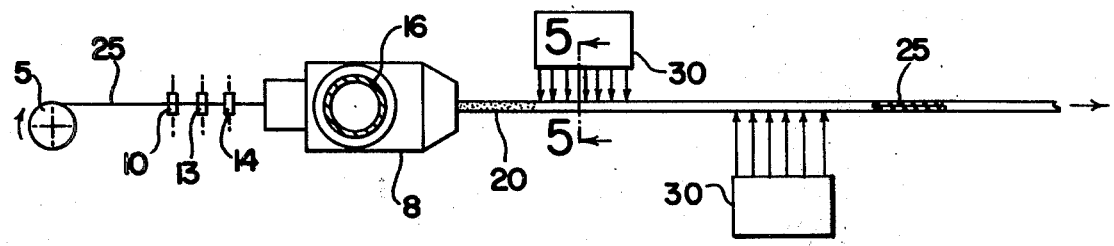
FIG. 3 is a side view of the same.

FIGS. 2 and 3 show coils 1, 2, 3, 4 and 5 of wire to be formed into beads. The wire generally is steel wire which is brass-plated. Instead of wires, other material such as fiberglass may be used if properly coated to form a good bond with the rubber when cured. The wires are suitably brought side-by-side in a horizontal plane by guide rollers and passed through an extruder 8. The rollers may be grooved, vertical rollers 10, 11, 12, 13 and 14 as illustrated in FIGS. 2 and 3, or they may be horizontal rollers suitably grooved, or other means for bringing the wires parallel to one another in one plane.

The wires are taut and are passed parallel to one another in a single plane through the extruder 8 which is supplied with rubber through the tuber head 16 or other suitable means.

Figure 1:
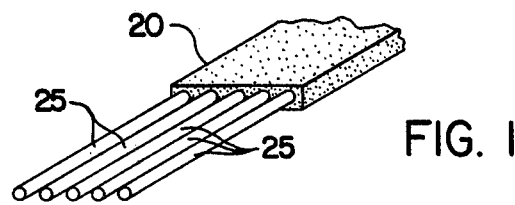
FIG. 1 is a perspective view of bead wires embedded in a rubber strip.

FIG. 2 clearly shows a strip 20 of rubber containing the wires, and FIG. 1 also shows this strip 20 wire the wires 25 entering the strip; which operation is accomplished within the extruder 8.

From the extruder the strip of rubber containing the wires passes under a suitable irradiation device 30 comprising a scan horn 32 from which the irradiation (indicated in FIG. 5) passes onto and through the rubber strip 20. The irradiation is sufficient to pass through the rubber strip and partially cure it.

The strip 20 passing out from the irradiation device can be stored in any suitable manner or used directly to form a bead core, and such a bead core 45 is shown in FIG. 6. It comprises five layers of strips 20 wound one on top of another. The bead core may comprise any number of wires in each strip and any number of windings.

The bead may be formed in any one of various ways. In fact, the wires need not be brought together in strips as shown, but this will be a usual procedure. The term "bead core" as employed herein comprises the various strips of rubber containing the wire wound on one another as indicated in FIG. 6. However, the bead core may be wrapped, or partially wrapped, as shown in FIG. 6 where there is fabric 48 which encloses the core of three sides. This fabric forms a part of this bead assembly. Additional rubber filler 50 will usually be included. This may extend out beyond the fabric 48 and a further fabric 52 which may be an ordinary flipper may be included as a part of the bead and enclose the other bead elements, as shown in FIG. 6. The further rubber portion 50 of the bead may be partially pre-cured and it may be pre-cured by irradiation, but if the volume is not too great it need not be pre-cured.

The bead assembly with the partially cured rubber surrounding the bead wires is embodied with the balance of the carcass. This may be done by wrapping inner plies 54 and 55 around the bead assembly in one way, and further plies 56 and 57 may be wrapped around in the opposite direction. The bead assembly may be incorporated in the carcass in any suitable manner, and FIG. 6 is purely illustrative.

The tire with the bead incorporated in it is then cured, and FIG. 7 illustrates the portions 60 and 61 of the curing mold which shape and cure the bead portion of the tire. It is noted that in FIG. 7 the wires are not aligned as in FIG. 6, but have been displaced somewhat from the perfect alignment. The tire is given a final cure and this will normally be a sulfur and heat cure as it is not feasible after assembly to subject a complete tire to irradiation curing.

I claim:

1. The process of producing a bead core for a pneumatic tire, comprising the steps of producing a tape consisting of an array of coplanar parallel flexible essentially inextensible tensile elements completely surrounded by rubber which contains heat-responsive curing ingredients and is also curable by electron irradiation, and subjecting both sides of the tape to electron irradiation, or other irradiation having the same curing effect on the rubber, to an extent increasing the firmness but not completely curing the rubber, coiling a plurality of convolutions of the tape into a ring of the size needed for the bead core, building the coil into a pneumatic tire with the margins of the plies turned around the bead coil, and heat-vulcanizing the assembly.

2. The process of claim 1 in which the irradiation is electron irradiation.

3. The process of claim 2 including the added step of wrapping the coil in rubberized fabric before building said coil into the tire.

4. A tire bead core made by the process of claim 2.

5. A wrapped tire bead core made by the process of claim 3.

6. A pneumatic tire made by the process of claim 3.

* * * * *

UNITED STATES PATENT AND TRADEMARK OFFICE
CERTIFICATE OF CORRECTION

PATENT NO. : 4,202,717
DATED : May 13, 1980
INVENTOR(S) : Theophilus K. Seiberling It is certified that error appears in the above—identified patent and that said Letters Patent is hereby corrected as shown below:

Column 1, line 27, after "natural: should read -- rubber --.
line 66, "an" should read -- any --.

Column 3, line 28, cancel "the" before "and".
line 49, "wire" should read -- with --.

Column 4, line 11, "of" first occurrence should read -- on --.

Signed and Sealed this

Fourth Day of November 1980

[SEAL]

Attest:

SIDNEY A. DIAMOND

Attesting Officer

Commissioner of Patents and Trademarks